United States Patent
Grinblat

(10) Patent No.: US 8,933,571 B2
(45) Date of Patent: Jan. 13, 2015

(54) METHOD AND SYSTEM FOR FULLY UTILIZING WIND ENERGY IN A WIND ENERGY GENERATING SYSTEM

(71) Applicant: Zinovy D Grinblat, Medford, MA (US)

(72) Inventor: Zinovy D Grinblat, Medford, MA (US)

(*) Notice: Subject to any disclaimer, the term of this patent is extended or adjusted under 35 U.S.C. 154(b) by 37 days.

(21) Appl. No.: 13/573,961

(22) Filed: Oct. 17, 2012

(65) Prior Publication Data

US 2014/0103651 A1    Apr. 17, 2014

(51) Int. Cl.
H02P 9/04 (2006.01)
(52) U.S. Cl.
USPC .............................. 290/44; 318/811
(58) Field of Classification Search
CPC .... H02P 2009/004; Y02E 10/763; H02J 3/32; H02J 3/38; H02J 3/386
USPC ........................................... 290/44
See application file for complete search history.

(56) References Cited

U.S. PATENT DOCUMENTS

| | | | |
|---|---|---|---|
| 7,554,302 B2* | 6/2009 | Schauder | 322/44 |
| 7,573,146 B2* | 8/2009 | Calley | 290/44 |
| 7,923,965 B2* | 4/2011 | Ritter et al. | 320/127 |
| 7,939,970 B1* | 5/2011 | Walling et al. | 307/84 |
| 2007/0235383 A1* | 10/2007 | Krokoszinski et al. | 210/321.65 |
| 2010/0308586 A1* | 12/2010 | Frank et al. | 290/44 |
| 2011/0089693 A1* | 4/2011 | Nasiri | 290/44 |
| 2011/0204637 A1* | 8/2011 | Ritter et al. | 290/44 |
| 2013/0113442 A1* | 5/2013 | Kawamura | 322/46 |
| 2014/0062097 A1* | 3/2014 | Brown et al. | 290/40 R |

* cited by examiner

*Primary Examiner* — Michael Zarroli
(74) *Attorney, Agent, or Firm* — Larisa Migachyov

(57) ABSTRACT

A wind energy system that converts fluctuating wind into electrical power, wherein part of the electrical power is converted into variable AC electrical power and fed into the grid, part is converted into DC power, and part is converted into heat.

11 Claims, 4 Drawing Sheets

METHOD AND SYSTEM FOR FULLY UTILIZING WIND ENERGY IN A WIND ENERGY GENERATING SYSTEM

FIELD OF THE INVENTION

The present invention relates generally to wind turbines, and particularly to a method and system for converting fluctuating wind into variable electrical power and fully consuming the variable electrical power.

BACKGROUND OF THE INVENTION

Some of the most important features of a wind power generator are the stability of its operation and its ability to feed the electric grid with constant voltage and frequency. Currently, typical wind generators use constant or variable rotation speed. The basis of this technology is to maintain an average mechanical power on the wind turbine shaft, to convert that to an average electrical power at the output of the generator, and then to connect the output of the generator to the electric grid (directly or through an electronic converter). However, the wind constantly fluctuates, and this makes it difficult to convert that into constant rotational motion of the wind turbine. Also, the wind speed above and below the hub may be different; wind shear at the tip of the blade may be different from the wind shear close to the center of the turbine; and gusts of wind may further decrease the consistency of the wind energy. To reduce instability, oscillation, vibration, and mechanical stresses produced by wind shear and gusts, gravity, and turbulence generated by the tower itself, most wind turbine manufacturers prefer to use three-blade wind turbines and aerodynamic pitch regulation technology. The disadvantage of this process of converting fluctuating wind speed into constant turbine rotation is a decrease in the kinetic energy that can be derived from the wind. The cost of the wind power plant depends on wind turbine diameter and weight, and blade weight depends on the torque, blade length, strength, and material. The blade weight then influences the weight of the other components, such as the rotor, hub, nacelle, drive train, tower, and foundation. Also, the cost of the wind power plant depends on the following parameters: whether or not a variable rotor speed generator (doubly fed induction generator) is used; the complexity of the electrical components such as the AC-DC-AC converter; peak power utilization; and the higher generator and transmission capacity needed for peak power.

The goal of the present invention is to overcome the problems inherent in the process of converting fluctuating wind into variable electrical power.

SUMMARY OF THE INVENTION

The present invention provides a method for directly converting fluctuating wind into variable mechanical power.

Furthermore, the present invention provides a method for converting variable mechanical power into variable electrical power.

Furthermore, the present invention provides a method for converting fluctuating wind into variable mechanical power by at least a one-blade wind turbine wherein the variable mechanical power produced by the one-blade wind turbine is collected on a carousel and transmitted from the carousel to an electrical generator through a counterweight. The weight of the rotating part of the wind turbine is supported by two bearings.

Furthermore, the present invention provides a method for reducing the average mechanical force on the shaft of the wind turbine, by not using the wind turbine weight as a flywheel; this reduces the weight of the wind turbine and the loads on the tower.

Furthermore, the present invention provides a method for strictly limiting the voltage and frequency of the electricity supplied to the grid and also limiting the voltage and frequency of electricity supplied for local usage (i.e. production of heat, hydrogen, and compressed air).

Furthermore, the present invention provides a method for completely consuming the variable electrical power P produced by an electrical generator, in accordance with the equation $P-Pc-Pv=0$ (1), wherein the variable electrical power P comprises a constant component Pc and a variable component Pv.

Furthermore, the present invention also provides a method for simultaneously drawing electrical power from two phases of a generator, for feeding the grid and for local usage, and drawing electrical power from a third phase of the generator for local usage, wherein the voltage of the third phase is not involved in the process of converting variable AC voltage into six-pulse DC variable voltage.

Furthermore, the present invention provides a method for utilizing rectified variable DC voltage, which is higher than constant DC voltage.

Furthermore, the present invention provides a method for converting the variable electrical power component Pv into heat through a heat exchanger.

Furthermore, the present invention provides a method for converting the variable electrical power P into a constant electrical power Pc through a six-pulse diode rectifier, heat exchanger, and DC capacitor.

The present invention is compatible with any wind turbine design.

Furthermore, the present invention provides a wind energy system based on a method of wind turbine operation control by stall, pitch, and variable speed techniques.

Furthermore, the present invention provides a wind energy system that completely utilizes the constant and variable components of electrical power Pc and Pv by using the regular electrical generator, a six-pulse diode rectifier, a six-pulse transistor rectifier, heat exhangers, capacitors, a DC-AC power inverter, and switches. The heat exchangers use the inefficiency in variable electrical power transmission in producing heat, hydrogen, and compressed air.

The present invention improves the efficiency of a wind turbine because it uses all of the static and dynamic components of wind energy, and the wind turbine extracts maximum mechanical power from the wind while also maintaining the optimum tip speed for the blades. The mechanical power extracted from the wind depends only on wind variation at the site (the Weibull Distribution), limitations to the blade tip speed (noise considerations), the limitations due to the mechanical strength and stiffness of wind turbines, towers, generators, and gearboxes, and restrictions due to the blade width (depending on blade width, some wind speeds may result in turbulence and change the force from positive to negative).

The wind energy system of the present invention comprises a wind turbine with at least one blade. The one blade wind turbine transmits the torque from the carousel to the drive train through the counterweight.

The advantage of a one-blade wind turbine over a standard three blade wind turbine is a reduction in cost and weight (of the blade, gearbox, generator, hub, nacelle, tower, foundation) and an increase in rotational speed.

In the wind energy system of the present invention, the control system permits it to extract maximum mechanical power from wind by instantly utilizing both the static and the dynamic components of wind energy and keeping the rotor aerodynamic efficiency high even in light winds; producing and consuming variable electrical power with accordance to the equation (1); increasing the operating time by collecting and storing hydrogen and/or compressed air; and returning its stored hydrogen and/or compressed air to the system during peak hours or directly to customers.

The system and method of the present invention completely consumes the mechanical power produced by the wind turbine (in other words, any change in the kinetic energy of the wind will be detected and completely realized by the wind energy system during on and off peak hours of wind power plant operation); the energy utilization will be 30% electrical energy, 30% heat energy and 30% hydrogen production. The system also satisfies the requirement of keeping intermittency to about 20% of normal use (local usage of the variable electrical power increases intermittency to about 60%). The system and method of the present invention also reduce the cost of the wind energy system by using one or two blade wind turbines, and by being able to integrate into the existing electrical grid.

The features and preferences of the present method and system based thereon are illustrated by the following figures by way of example which are not necessarily drawn to scale and not limiting in the figures of the accompanying drawings and the following detailed description.

DETAILED DESCRIPTION OF THE INVENTION

The system and method of the present invention enable direct conversion of fluctuating wind energy into variable electrical power and complete consumption of the variable electrical power.

Figure 1:
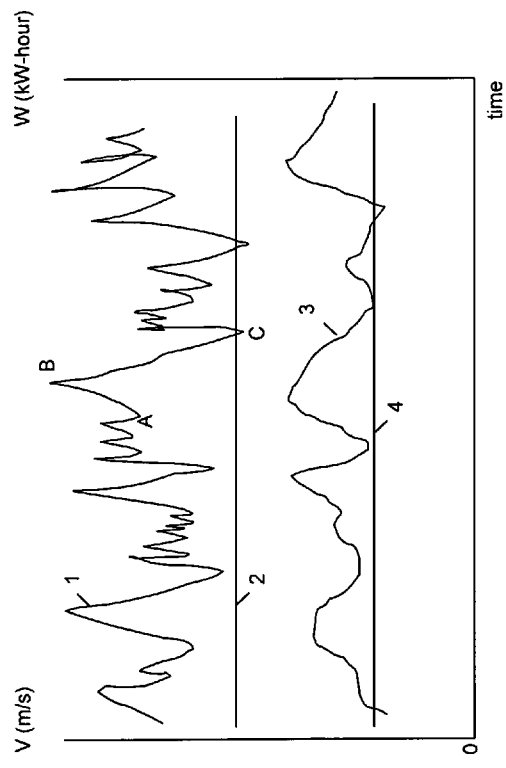
FIG. 1 illustrates fluctuating wind speed and kinetic energy.

FIG. 1 illustrates fluctuating wind speed and kinetic energy (speed is shown in the upper graph, and kinetic energy is shown in the lower graph). Note that both speed and kinetic energy can be expressed as the sum of a constant component (shown as line 2 and line 4) and a variable component (shown as line 1 and 3).

Figure 2:
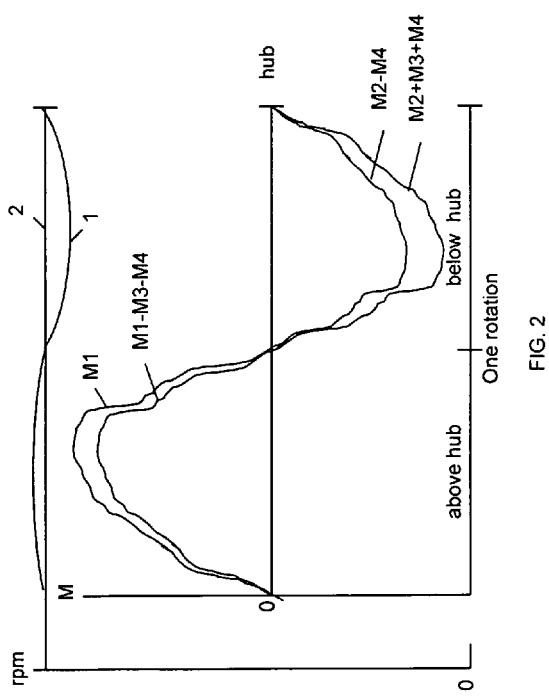
FIG. 2 illustrates the basic principle of existing methods of extracting mechanical power from the wind.

The basic principle of extracting mechanical power from the wind is illustrated in FIG. 2. M is the mechanical power delivered to the shaft of the turbine. The kinetic energy of the wind is converted into mechanical power produced by turbine rotation. As a turbine blade passes above the hub, it generates mechanical power M1; as it passes below the hub, it generates mechanical power M2 (less than M1, because it passes in front of the tower). The stored kinetic energy of the turbine is converted into mechanical power M3+M4 during the blade's rotation below the hub (which also compensates for wind shear and the losses generated by the blade's passing in front of the tower, to some extent). Thus, the average mechanical power on the shaft is M, and the turbine is caused to rotate at a constant speed both above and below the hub. The mechanical power M is then converted into electricity. Since the actual power (rather than the average power) is variable, stability is maintained by using the rotor mass as a flywheel. The mass of the flywheel depends on the length of the blades, the number of blades, and other parameters. This makes the wind turbine system highly inertial and unable to take full advantage of wind fluctuations. Also, the larger and heavier the wind turbine, the greater the cyclic loads on it (due to gravity, yaw/tilt, vertical wind shear, unpredictable wind gusts, etc.)

Furthermore, as the wind speed increases and decreases (shown as sections A-B and sections B-C on the graph in FIG. 1), the extra Wind kinetic energy produced above the hub converts into extra kinetic mechanical energy (i.e. speeding up the wind turbine rotation). As the turbine blade rotates below the hub, if the wind happens to slow down during that time period (as shown in Section B-C), the kinetic energy produced during that portion of the cycle is not sufficient to keep the turbine rotating at a constant rate. This leads to cycling in rotational speed and vibration in the mechanical system, and also negatively influences electrical grid stability.

The system and method of the present invention eliminates the step of using the wind turbine mass as a flywheel, and converts both the constant and variable components of fluctuating wind speed into variable mechanical power; the wind turbine rotational speed tracks the wind speed.

Figure 3:
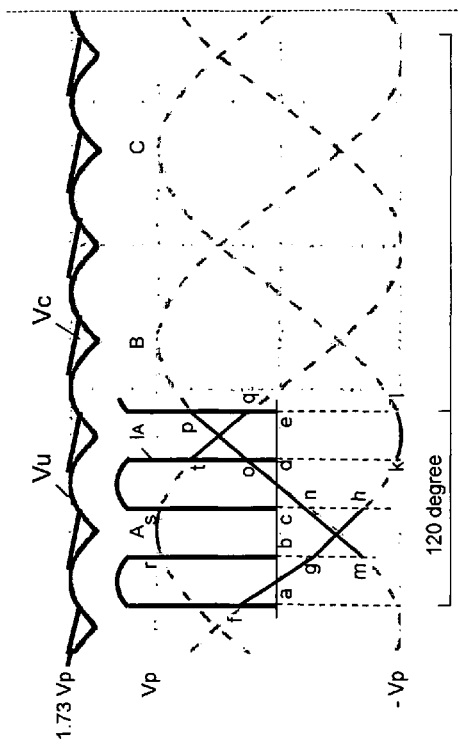
FIG. 3 illustrates the basic principle of the existing method of utilizing a six-pulse diode rectifier.

FIG. 3 shows the prior art method of using a six-pulse diode rectifier. As is shown in the Figure, a six-pulse diode rectifier converts 3-phase AC voltage into unfiltered six-pulse DC voltage Vu through a six-diode bridge rectifier, and feeds the load through capacitor Vc. FIG. 3 shows the process of charging the capacitor Vc through input phases A-B and A-C. When the input voltages A-B and A-C are higher than the capacitor voltage Vc, the AC current IA=Ic+Ir drawn from its phases charges the capacitor (Ic) and feeds the load (Ir) simultaneously. The charging zones a-b and c-d last 30 degrees each for each double peak AC current 1A, and third phases C (curve f-g) and B (curve n-o) inside the charging zones a-b and c-d are not involved in the process of charging the capacitor.

When the capacitor voltage Vc is higher than the input voltages A-B and A-C, the capacitor alone feeds the DC-AC power inverter (see AC zero current zones b-c and d-e). The discharging process lasts 30 degrees for each zero current zone, wherein voltages represented as curves g-h, m-n, r-s, o-p, t-q, and k-l are not involved in the process of feeding the load. These unusable voltages presented in the zero and peak current zones account for about 50% of power losses during a 360-degree period, which causes inefficiency in the utilization and transmission of electrical power. Thus, this necessitates special schemes such as passive and active filters, reactive components, and special transformers (such as isolated delta and Y configuration) for building a 12-pulse rectified DC voltage. The 12-pulse rectified DC voltages increase the unusable phases from 1 to 4 because the rectification process only involves two phases.

The cheapest way of reducing the inefficiency is to add an inductor at the AC input or the DC output of the six-pulse diode rectifier. This allows the capacitor to be charged over a longer period of time, by reducing the AC current zero zones and harmonics; the additional inductor can reduce typical distortion levels from more than 80% to less than 20% THD. However, the third phase voltage is never involved in charging the capacitor, and the harmonics due to sine wave distortion are a source of heating in the generator and transmission lines. The inefficiencies mean that much higher (at least double) torques need to be drawn from the wind turbine and generator.

The method of the present invention allows some of these problems to be resolved, by eliminating peak currents drawn from the electrical generator, reducing the total masses of iron and copper, reducing the capacitances of the DC power capacitors in the AC-DC-AC power converters, increasing the power coefficients, and reducing the complexity, weight, and cost of the wind turbine.

Figure 4:
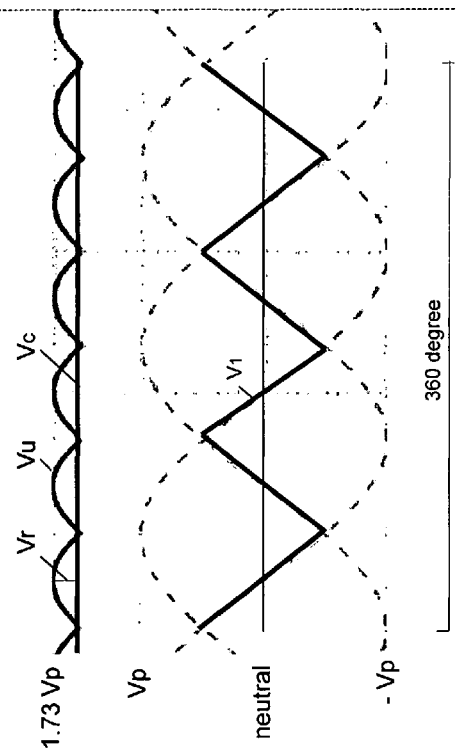
FIG. 4 illustrates the basic principle of the method of the present invention for utilizing a six-pulse diode rectifier.

FIG. 4 illustrates the principle of the method of the present invention for utilizing variable electrical power. The present method of producing and consuming variable electrical power satisfies: the requirement of completely consuming the variable mechanical power produced by the wind turbine; utilization of 30% electrical energy, 30% heat energy and 30% hydrogen production; strict limitations on the voltage and frequency of the electricity sent to the grid; optional limitations to the voltage and frequency of the electricity used locally—e.g. for producing heat, hydrogen, and compressed air. The present method of producing and consuming variable electrical power is based on: keeping the voltage at the capacitor Vc below the rectified unfiltered six-pulse voltage Vu; keeping the voltage at the capacitor Vc constant; drawing AC current from three phases of the electrical generator. This will be explained in detail below.

Figure 5:
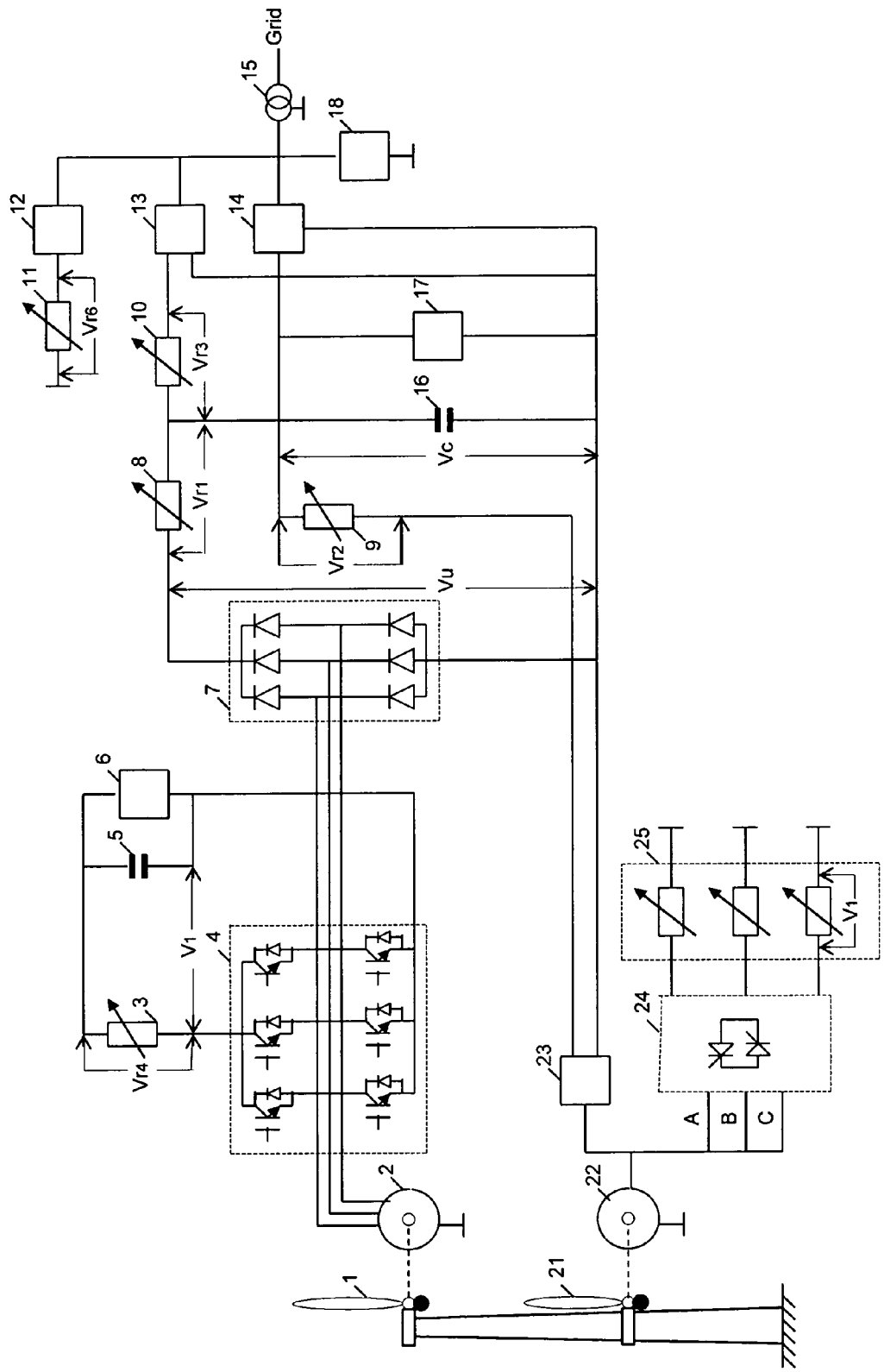
FIG. 5 illustrates the basic principle of the method of the present invention for utilizing fluctuating wind.

FIG. 5 shows a diagram of the system of the present invention, including wind turbines 1, 21; three phase generators 2, 22; six-pulse diode rectifiers 7, 13, 23; six-pulse transistor rectifier 4; switches 12, 24; variable voltage heat energy exchangers 3, 8-11, 25; DC-AC inverter 14; capacitors 5, 16; DC local consumers 17; AC local consumers 18; transformer 15. The heat energy exchangers may comprise a resistor or a set of resistors, and switches. The electronic switches, which may be Insulated Gate Bipolar Transistors (IGBT), thyristors, or mechanical switches, are connected in parallel to transistors (not shown). The mechanical switches turn on during an emergency stop of the wind turbine, e.g. for a broken DC-AC power inverter, trouble with the grid, or trouble with the generator. The local consumers of DC electricity are producers of heat, hydrogen, and/or compressed air. Local consumers of AC electricity are devices that use AC power such as TV's, computers, lights, air conditioners, and other electrical appliances. The wind turbines can be any type of turbine; the one-blade wind turbines shown in the Figure are chosen as the worst-case scenario of cycling mechanical power, converting the cycling mechanical power into variable electrical power, and fully utilizing the variable electrical power with good performance and low cost. The operation and features of the one-blade wind turbines will be explained later.

The basic principle of the present method of utilizing fluctuating wind comprises: converting the fluctuating wind into variable mechanical power through wind turbines 1 and 21; converting the variable mechanical power into variable voltage and frequency alternating current (AC) power P through generators 2 and 22; converting variable voltage and frequency AC power P into unfiltered DC variable six-pulse voltage powers Pv through six-pulse diode rectifiers 4, 13, and 23; converting the unfiltered DC variable six-pulse voltage Vu into constant voltage Vc at the capacitor 16 through heat energy exchangers 8-10 (Vu=Vr+Vc wherein Vr is the variable voltage drops around the heat energy exchanger); inverting the constant voltage power through the DC-AC power inverter 14 at the capacitor 16 into stable-voltage and stable-frequency AC power in accordance with the voltage and frequency parameters requested by electrical grid operators; feeding local AC usage 18 with stable-voltage and stable-frequency AC power; transmitting the stable-voltage and stable-frequency AC power through the transformer into the grid; converting the variable-voltage and variable-frequency AC power Pv into heat via the resistors 3, 11, and 25. The heat energy exchangers 8-10 consume the variable component Vr of the variable six-pulse voltage Vu. Since the variable component of voltage Vu is consumed, the voltage on capacitor 16 is kept constant, as is the voltage on the DC-AC power inverter 14, and the variable six-pulse voltage Vu is higher than the DC voltage at the capacitor 16, which reduces harmonics in the AC and DC lines. The values of the resistors are chosen so as to limit the current drawn from the generator at the time the capacitor starts charging from zero to its nominal voltage, and to feed the DC-AC power inverter at the maximum allowable cycling rotational speed of the wind turbine, for example, varying the wind turbine rotational speed +/−15% of the rated wind turbine speed. The six-pulse diode rectifier 13 is activated at the initiation of rotation for the wind turbines 1 and 22, and also to feed local usage of DC electricity when the wind is low or absent.

The extra AC electrical power drawn from the third phase of the electrical generator V1 is converted into heat through the three switches 24 and the three resistors 25 connected to ground (the heat energy exchanger 11 and set of switches 12 are similar). In other embodiments, the extra electrical power drawn from the third phase is converted into DC constant voltage Vc at the capacitor 5 through the six-pulse transistor rectifier 4 and heat energy exchanger 3. The constant DC power feeds local usage 6. In other embodiments, the extra electrical power drawn from the third phase V1 of the generator is first converted through a step-up transformer (not shown) into variable AC voltage V1 equal to the variable AC voltage produced by the generator, then the variable AC voltage V1 is converted into constant DC voltage at the capacitor through the six-pulse transistor rectifier 4 and heat energy exchanger 3, and is used to feed local usage or the DC-AC inverter (not shown).

Thus, the electrical power produced by the wind turbine should be consumed by the local usage of DC and AC voltage 6, 17, 18, the grid, and heat energy exchangers 3, 8, 9, and 25. Thus, P=P6+P17+P18+Pgrid+P3+P8+P25.

During low wind, the electrical power produced by the wind turbines is supplemented by electrical power transmitted from the grid and consumed by local usage loads (both DC and AC) 6, 17, and 18, and heat energy exchangers 3, 8-11, and 25. Thus, P+Pgrid=P6+P17+P18+P3+P8+P9+P10+P11+P25. Utilization of the heat energy exchanger 11 helps improve the efficiency.

The system of the present invention comprises a control system that regulates the electrical power consumed by the grid by increasing or decreasing constant DC voltage Vc at the capacitor 16 by balancing the consumption of electrical power of local usage 17 and heat energy exchangers 8-10.

The system of the present invention is thus based on sensing any changes in kinetic energy of the wind, and instantly converting this kinetic energy into variable electrical power; utilizing all the produced electrical power; utilizing AC power either for local usage or to feed the grid; utilizing DC power either for local usage or to produce heat, hydrogen, compressed air, or warm water. Whether the surplus DC power is used to generate hot water, hydrogen, heat, or compressed air, is dependent on user needs.

Figure 6:
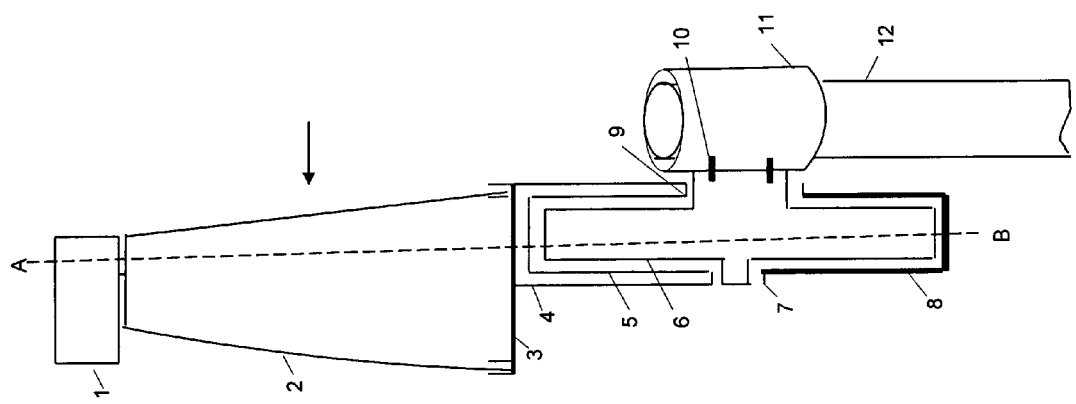
FIG. 6 is a kinematic view of a one blade wind turbine system.
Figure 6:
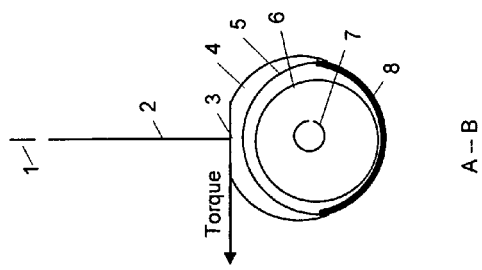

FIG. 6 shows a view of a one-blade wind turbine system. The one-blade wind turbine system of the present invention preferably includes a swept-blade tip 1, blade base 2, pitch mechanisms 3, wind turbine carousel 4, flat circle road 5, main frame 6, counterweight 8, bearings 7 and 9, bolts 10, and tower 12. The counterweight 8 statically balances the masses of swept blade 1, blade base 2, and pitch mechanisms 3, and absorbs a high level of vibration. The wind turbine masses are supported by the main frame 6. The torque collected on the carousel 4 spins the flat circle road 5 through the counterweight 8. The flat circle road 5 is a DDPM generator rotor or a one-stage planetary gear box.

In the preferred embodiment, the wind turbine converts fluctuating wind energy into variable mechanical power (torque) on the carousel 5. This mechanical power rotates the flat circle road. Cost may be minimized by downwind mode of operation, eliminating peak current drawn from the generator, and driving more mechanical power from rotational speed than torque. The method of eliminating peak currents drawn from the generators means that the active length of the generators can be lowered, as can the air gap of the generators, the masses of the wind turbine and the DDPM generator, the structural materials needed to build the carousel and tower, the gear box, hydraulic system and supporting bearings. The speed of the DDPM generator rotors is dependent on rotational speed of the one-blade wind turbine, the radius of the carousel 4, the flat circle road 5 or the one-stage planetary gear ratio and multiple generator rotor radiuses (not shown). The one-blade turbine of the present invention preferably uses low-cost, low-weight blades that are not twisted, and uses swept blade tips 1. The tip speed may be limited for low-noise environments, or allowed to be higher for high-noise environments. The pitch mechanism controls the rotational speed and power of the wind turbine, the angle of attack of the blade with respect to the wind, any turbulence on the trailing edge of the blade, and disables blade rotation if nominal turbine speed, rated power, or maximum permissible tip speed are reached. In the preferred embodiment, the preferred blade length is 25 m, and preferred tower height is about 130 m. Thus, the swept area covered by two one-blade wind turbines as shown in FIG. 5 is 6770 sq. meters, which assumes a blade length of 25 m, swept blade tip length of 6 m, carousel radius 4 m, and losses of about 6% (when the blades pass in front of the tower). The rated mechanical power on the lower wind turbine shaft is $P=0.5*\rho*C_p*(\pi r2)*V^3$, where $C_p$—power conversion coefficient of the rotor; $(\alpha r2)$—swept area by the rotor (m2); V—wind speed (m/s); $\rho$—air density (kg/m3). The tip speed ratio is about 9.4.

The embodiment described above is the preferred embodiment of the invention; those skilled in the art will realize that various modifications and additions may be implemented. Some of the modifications may be based on co-generation technologies (i.e. production of both electricity and heat energy simultaneously), and some may be integration technologies (i.e. production of electricity by wind turbine generator and gas turbine generator simultaneously). In the integration process, the heat produced by the wind turbine of the present invention (from the variable electrical power) converts into electricity through a gas-turbine generator and combines with the electrical power produced by the wind turbine, feeding the grid at a time of low wind.

What is claimed is:

1. A variable speed wind energy system comprising:
   an electrical generator coupled to a wind turbine, said wind turbine having at least one blade;
   a six-pulse diode rectifier coupled to the electrical generator;
   a first variable heat energy exchanger coupled to the output of the six-pulse diode rectifier, the variable heat energy exchanger coupled to a DC capacitor, DC-AC inverter, said DC-AC inverter having an output, and DC constant voltage local usages;
   the output of the DC-AC inverter coupled to at least one of the following:
   AC local usages of electricity and the electrical grid;
   a six-pulse transistor rectifier coupled to the electrical generator;
   a second variable heat energy exchanger coupled to an output of the six-pulse transistor rectifier on one side and another side of the second variable heat energy exchanger coupled to a second DC capacitor and second constant voltage local usages;
   the second variable heat energy exchanger coupled to a neutral line through switches.

2. The variable speed wind energy system of claim 1, wherein the wind turbine comprises one blade, a carousel, a counterweight and two supporting bearings.

3. The variable speed wind energy system of claim 1, wherein the mechanical power produced by the one blade wind turbine is provided to an electrical generator through a counterweight.

4. The variable speed wind energy system of claim 1, wherein the electrical generator provides electrical power to an electrical grid and for DC and AC local usages simultaneously.

5. The variable speed wind energy system of claim 4, wherein the generator provides electrical power by drawing power from two phases of a generator.

6. The variable speed wind energy system of claim 4, wherein the generator provides electrical power for local DC usages by drawing power from the third phases of three AC phases of the generator.

7. The variable speed wind energy system of claim 1, wherein the generator provides electrical power for DC and AC local usages and the grid through variable heat energy exchangers.

8. The variable speed wind energy system of claim 7, wherein the variable heat energy exchangers convert part of the electrical power into heat.

9. The variable speed wind energy system of claim 4, wherein local usages comprises production of heat, hydrogen and compressed air.

10. The variable speed wind energy system of claim 1, wherein the variable heat energy exchanger comprises at least one resistor and at least one switch.

11. A method for operating a variable speed wind energy system comprising the steps of:
    converting fluctuating wind energy into variable mechanical power by a wind turbine having at least one blade, a carousel, and a counterweight, wherein the mechanical power is collected on the carousel and transmitted from the carousel to an electrical generator through the counterweight;
    converting the mechanical power into a variable voltage and frequency AC power by an electrical generator;
    converting the variable voltage and frequency AC power into a variable six-pulse DC power through a six-pulse diode rectifier;
    converting the variable voltage and frequency AC power into a variable six-pulse DC power through a six-pulse transistor rectifier,
    converting a variable six-pulse DC power into constant voltage DC power through a variable heat energy exchanger and DC capacitor;
    converting the constant voltage DC power into an AC power through a DC-AC power inverter connected in parallel to the DC capacitor;
    drawing AC currents from three AC phases of a generator simultaneously for feeding local usages and grid;

permanently keeping the rectified unfiltered variable DC voltage higher than a DC constant voltage at the capacitor.

\* \* \* \* \*